(12) United States Patent
Schmidt et al.

(10) Patent No.: US 6,666,492 B1
(45) Date of Patent: Dec. 23, 2003

(54) VEHICLE INSTRUMENT PANEL ASSEMBLY

(75) Inventors: Robert Mark Schmidt, Livonia, MI (US); Charles Bruce Banter, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/325,332

(22) Filed: Dec. 20, 2002

(51) Int. Cl.[7] .............................................. B62D 25/14
(52) U.S. Cl. ...................................................... 296/70
(58) Field of Search .............................. 296/37.12, 70, 296/74, 73; 180/90; 224/929; 439/534, 34

(56) References Cited

U.S. PATENT DOCUMENTS

| | | | |
|---|---|---|---|
| 2,091,059 A | | 8/1937 | Tjaarda |
| 3,039,642 A | | 6/1962 | Perkins |
| 3,061,394 A | | 10/1962 | Whetstone |
| 4,087,126 A | * | 5/1978 | Wynn .......................... 224/929 |
| RE33,112 E | | 11/1989 | Durham |
| 5,102,181 A | | 4/1992 | Pinkney |
| 5,259,655 A | * | 11/1993 | Anderson ...................... 296/70 |
| 5,338,081 A | | 8/1994 | Young et al. |
| 5,823,599 A | | 10/1998 | Gray |
| 6,086,129 A | | 7/2000 | Gray |
| 6,158,795 A | * | 12/2000 | Gray et al. ................... 224/929 |
| 6,176,534 B1 | * | 1/2001 | Duncan .................... 296/37.12 |
| D449,026 S | | 10/2001 | Tsay et al. |
| 6,354,649 B1 | | 3/2002 | Lee |
| D455,691 S | | 4/2002 | Okonkwo |
| 6,394,526 B1 | * | 5/2002 | Gyllenspetz .............. 296/37.12 |
| 6,428,072 B1 | * | 8/2002 | Moore ...................... 296/37.12 |
| 2001/0011664 A1 | * | 8/2001 | Meritt .......................... 224/929 |
| 2003/0001406 A1 | * | 1/2003 | Shibata et al. ................. 296/70 |

FOREIGN PATENT DOCUMENTS

| | | | | |
|---|---|---|---|---|
| JP | 355008975 A | * | 1/1980 | .............. 296/37.12 |
| JP | 406219220 A | * | 8/1984 | .............. 296/37.12 |
| JP | 406087387 | | 3/1994 | |
| JP | 409267662 | | 10/1997 | |
| JP | 410006836 | | 1/1998 | |

* cited by examiner

Primary Examiner—Stephen T. Gordon
Assistant Examiner—Jason Morrow
(74) Attorney, Agent, or Firm—Bill C. Panagos

(57) ABSTRACT

A vehicle instrument panel assembly includes an instrument panel portion and a console pivotably connected to the instrument panel portion about a horizontal axis of rotation. The console is movable between open and closed positions relative to the instrument panel portion. The console comprises a first surface portion having a primary electronic item and a second surface portion having a secondary electronic item. The primary electronic item is accessible to a vehicle occupant when the console is in the open and closed positions. The secondary electronic item is accessible to the vehicle occupant only when the console is in the open position.

20 Claims, 3 Drawing Sheets

VEHICLE INSTRUMENT PANEL ASSEMBLY

BACKGROUND OF THE INVENTION

1. Field of the Invention

One aspect of the present invention relates to a console for providing additional surface area for vehicle controls and/or devices with convenient vehicle occupant access.

2. Background Art

Customarily, vehicle systems, for example information, environmental, and entertainment systems, are incorporated into the center of a vehicle instrument panel, which is commonly referred to as a center stack area. For example, numerous vehicle systems can be stacked, such as radio and heating ventilation and air conditioning (HVAC) systems and their respective controls. Typically, other systems can also stacked, such as a clock, cassette player, compact disc player, etc, with their respective controls exposed for use by a vehicle driver or passenger.

Currently, an increasing amount of vehicle systems, such as compact disc changers, digital video disc (DVD) players and navigation systems, are offered as vehicle options. In certain circumstances, the center stack area cannot be equipped with every vehicle system option requested by an individual since the stacking space is limited. This problem can be partially alleviated by positioning the actual components elsewhere in the vehicle, mounting the electronic controls on the surface of the center stack area, and connecting the actual components to the electronic controls via a flex cable, flat wire, or transmitted radio frequency signals to provide more stacking space. Unfortunately, there still remains a limited amount of surface area available on the center stack for mounting electronic controls. Consequently, an individual may not be able to equip the vehicle with all requested options.

Additionally, vehicle occupants typically access other electronic devices, such as a cell phone or personal digital assistant while in the vehicle. These devices are typically charged by the process of inserting a flexible charging cable which is connected to the device into a cigarette lighter and allowing the device to sit on the vehicle floor or a vehicle seat while charging. As a result, the device is prone to slide around the vehicle, hitting the door panel or sliding under a vehicle seat. Moreover, if the device is not connected to the charging cable, it can become easily lodged beneath the vehicle seat or some other hard to access area of the vehicle, making it difficult for the vehicle driver to access the device for use.

Therefore, it is desirable to provide a vehicle instrument panel assembly incorporating a console which increases the surface area for vehicle controls and/or devices. It is also desirable to provide a console which provides convenient vehicle occupant access while these individuals are seated in the vehicle.

SUMMARY OF THE INVENTION

One aspect of the present invention overcomes the above-referenced problems associated with prior instrument panel assemblies by providing a console pivotably connected to an instrument panel portion about a horizontal axis of rotation.

More specifically, in one preferred embodiment, a vehicle instrument panel assembly is disclosed which comprises an instrument panel portion and a console pivotably connected to the instrument panel portion about a horizontal axis of rotation. The console is movable between open and closed positions relative to the instrument panel portion. The console comprises a first surface portion having a primary electronic item and a second surface portion having a secondary electronic item. The primary electronic item is accessible to a vehicle occupant when the console is in the open and closed positions. The secondary electronic item is accessible to the vehicle occupant only when the console is in the open position.

Accordingly, an object of the invention is to provide a console which increases the surface area for vehicle controls and/or devices.

A further object of the invention is to provide console which provides convenient vehicle occupant access while these individuals are seated in the vehicle.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
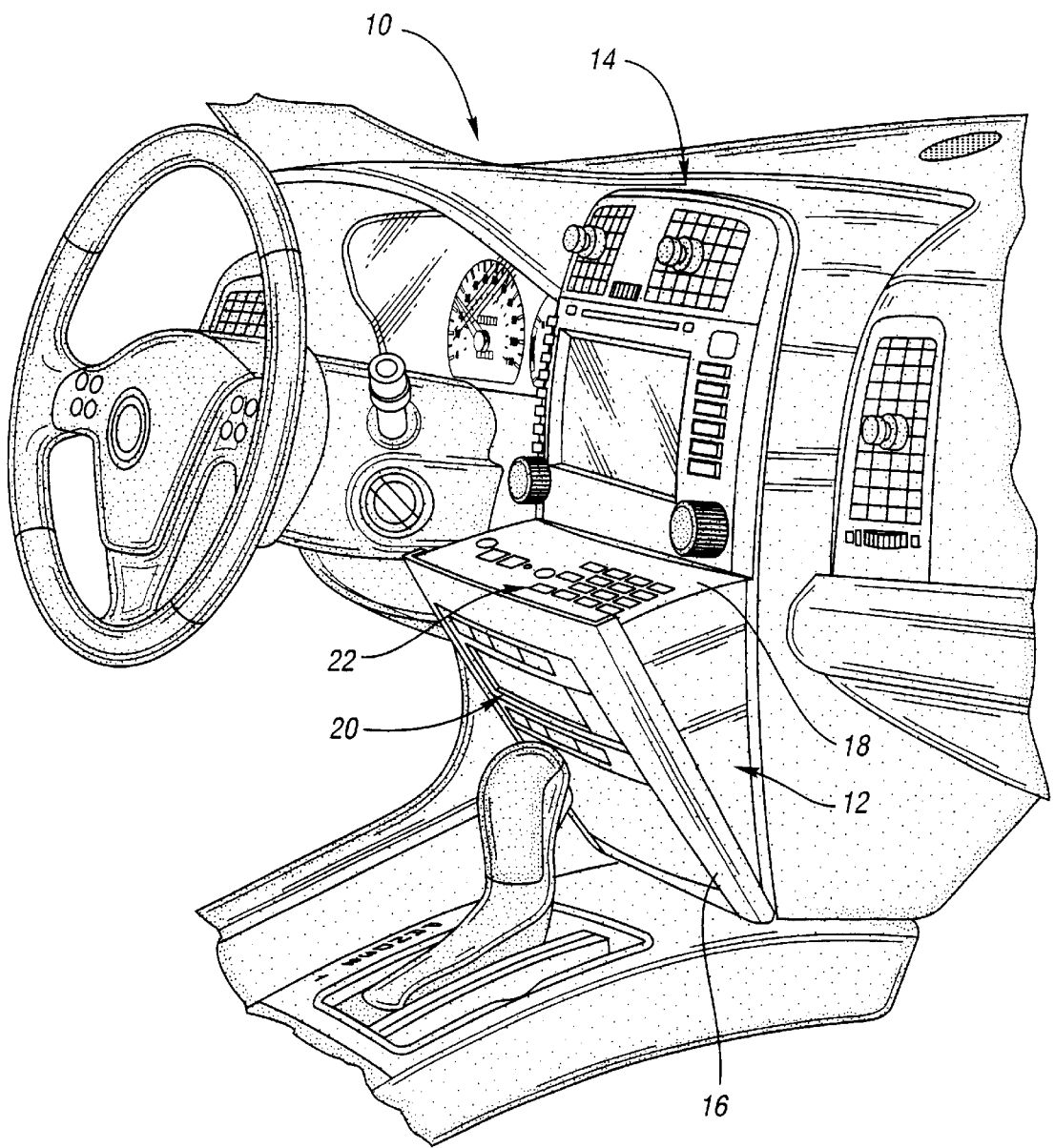
FIG. 1 shows a perspective view of a vehicle instrument panel assembly incorporating a console in accordance with a preferred embodiment of the present invention.

Referring to FIG. 1, vehicle instrument panel assembly 10 is shown in accordance with a preferred embodiment of the present invention. Instrument panel assembly 10 includes console 12 positioned in center stack area 14 of instrument panel assembly 10. According to FIG. 1, center stack area 14 is generally located at the center of instrument panel assembly 10.

As shown in FIG. 1, console 12 is comprised of first surface portion 16 for housing at least one primary electronic items and second surface portion 18 for housing at least one secondary electronic item and providing additional surface area for housing electronic items. As depicted in FIG. 1, the primary electronic item is comprised of vehicle system control 20 for a radio and heating ventilation and air conditioning (HVAC), and the secondary electronic item is comprised of telecommunications keypad 22 for a vehicle telecommunications system. In accord with a preferred embodiment of the present invention, primary electronic items are utilized by vehicle occupants more frequently than secondary electronic items. For example, electronic items that are considered vehicle extras can be classified as secondary electronic items. As another non-limiting example, a vehicle purchaser can identify which electronic items are more or less frequently used than others when selecting vehicle options. Specific examples of electronic items contemplated by this invention which can be categorized as primary or secondary based on frequency of use can include, but are not limited to, radio controls, HVAC controls, defog switches, rear wiper switches, hazard switches, insertable media control systems (such as compact disc changer controls and digital video disc (DVD) controls), electrical interface systems (such as recharging ports for cell phones and personal digital assistants (PDAs)), other electronic items (such as a vehicle navigation control system and a telecommunications keypad), etc. It should be understood that the electronic items may include the actual components based on spacing considerations, etc.

Console 12 is movable between a closed position for accessability of primary electronic items by a vehicle occupant, for example, vehicle driver or front seat passenger, at all times and an open position for accessibility of secondary electronic items when the vehicle occupant wants to use the secondary electronic item. Secondary electronic items, which are preferably less frequently used than primary electronic items, are hidden from use and the vehicle occupant when console 12 is in the closed position, and are easily accessible by the vehicle occupant when console 12 is in the open position. In the closed position, second surface portion 18 is housed in a portion of vehicle instrument panel 10. Console 12 preferably provides ergonomic accessability to primary and secondary electronic items while not interfering with the knees of vehicle occupants when in the open position.

Figure 2:
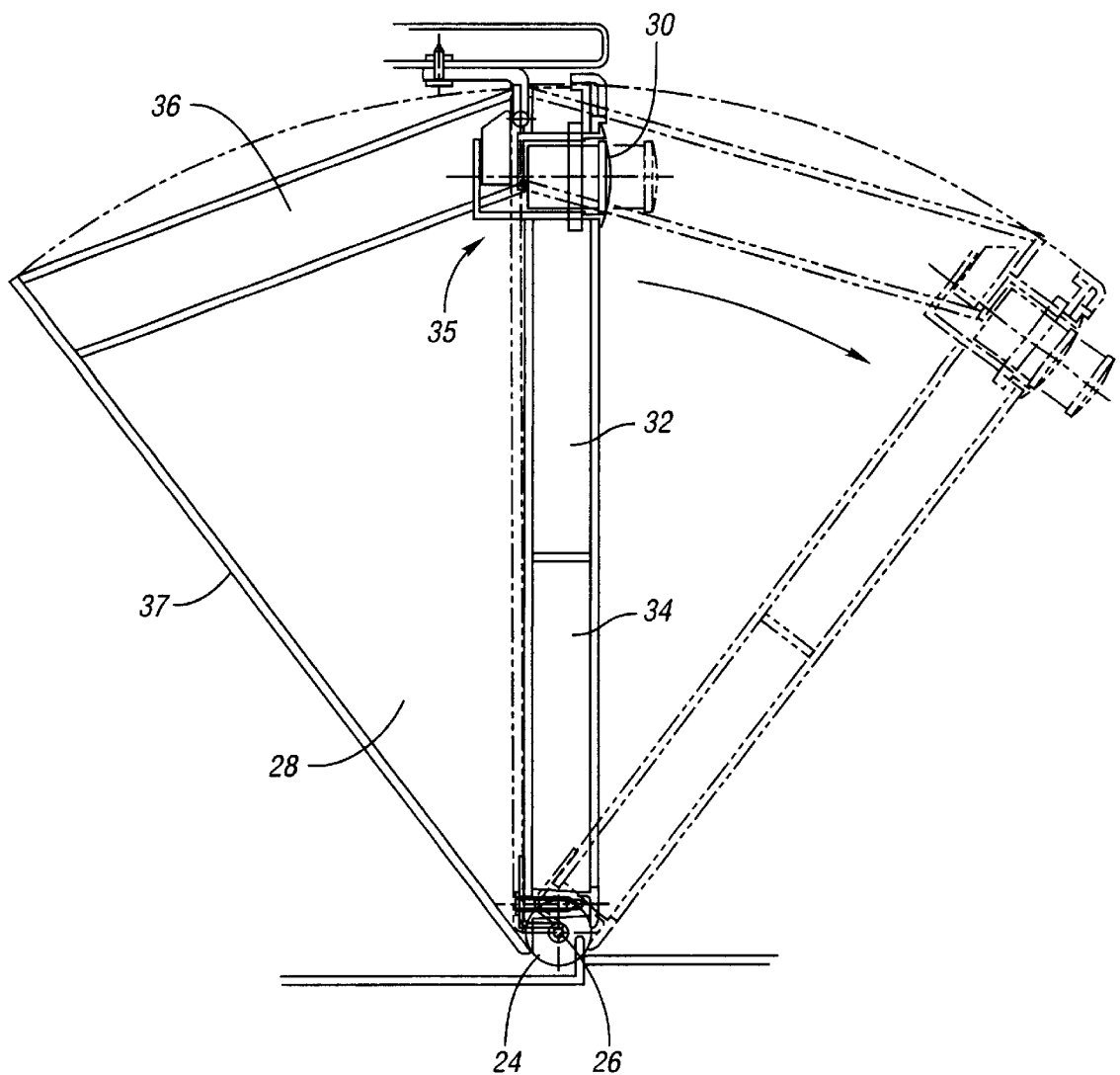
FIG. 2 shows a vertical cross-sectional view of the vehicle instrument panel assembly of FIG. 1.

According to FIGS. 1 and 2, console 12 is pivotally connected to instrument panel pivot mount 24 about horizontal axis of rotation 26 located preferably adjacent to bottom 28 of console 12. Console 12 is tilted outward about horizontal axis of rotation 26 from the closed position to the open position shown in phantom in FIG. 2 through a tilt angle to provide accessibility to secondary electronic items. The tilt angle is a function of the surface area of second surface portion 18 necessary for secondary control items and the accessibility to first and second surface portions by vehicle occupants. It is fully contemplated that the tilt angle can vary as long as the surface area of second surface portion 18 accommodates the controls and devices to be included on second surface portion 18 and first and second surface portions 16 and 18 are accessible by the vehicle occupant when console 12 is tilted outward. For many applications, secondary surface portion 18 tips slightly forward from a horizontal plane parallel to the ground. The tilt angle can be in the range of about 10 degrees to about 45 degrees, preferably about 15 degrees to about 30 degrees. It is understood that FIG. 2 is merely illustrative of one preferred pivot mechanism. As another non-limiting example, console 12 can include an elongated cylindrical horizontal channel for receiving a pivot rod with first and second ends for engaging an instrument panel pivot mount. Console 12 is also provided with release button 30, which is connected to locking device 35, for unlocking console 12 to allow for the pivotal movement. Console 12 can be lockable in the closed and open positions. When console 12 is in the open position, back wall 37 is held in place by locking device 35, thereby locking console 12 in the open position. When console 12 is in the closed position, console 12 is held in place by locking device 35, as depicted on FIG. 2.

As depicted in FIG. 2, first surface portion 16 includes spaces 32 and 34 for housing primary electronic items, which may include their corresponding circuit boards. Secondary surface portion 18 includes space 36 for housing a secondary electronic item, which may include its corresponding circuit board. The actual components are preferably positioned elsewhere in the vehicle and can be connected to the primary and secondary electronic items by a flex wire, flex cable, or transmitted radio frequency signals, for example. By housing the actual components elsewhere in the vehicle, for example, under the seat, in the trunk, or in the instrument panel assembly, etc., relatively more electronic items can be housed on primary and secondary surface portions 16 and 18.

Figure 3:
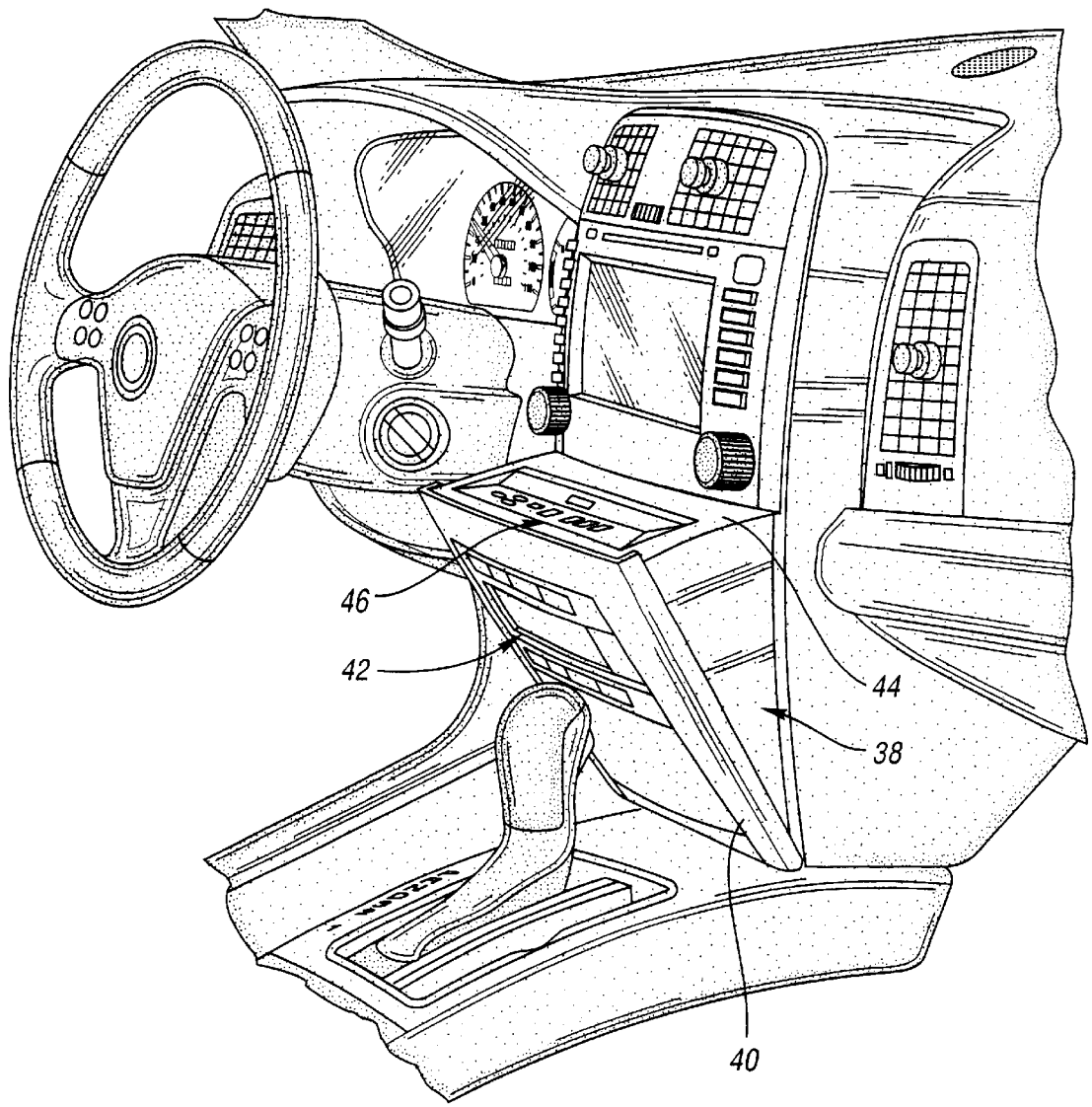
FIG. 3 shows a perspective view of a console in accordance with an alternative embodiment of the present invention.

FIG. 3 depicts alternative console 38 in accordance with a preferred embodiment of the present invention. As shown in FIG. 3, console 38 is comprised of first surface portion 40 for housing vehicle control system 42 for a radio and HVAC and second surface portion 44 for housing DVD player 46. According to this embodiment, DVD player 46 is comprised of DVD control face and housing wherein the housing contains the DVD components. The DVD output screen can be located elsewhere in the vehicle, for example, on the headrest or above console 38. Advantageously, console 38 is sized to accommodate DVD housing and vehicle system control 42. Therefore, this embodiment can be used to house most off-the-shelf DVD players. In other words, the DVD control face does not have to be separated from the actual DVD components. It should be understood that other electronic items including the actual components, can be positioned within console 38 based on spacing considerations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle instrument panel assembly comprising:
   an instrument panel portion; and
   a console pivotably connected to the instrument panel portion about a horizontal axis of rotation, the console movable between open and closed positions relative to the instrument panel portion, the console comprises a first surface portion having a primary electronic item and a second surface portion having a secondary electronic item, the primary electronic item being accessible to a vehicle occupant when the console is in the open and closed positions, and the secondary electronic item being accessible to the vehicle occupant only when the console is in the open position.

2. The vehicle instrument panel assembly of claim 1 wherein the primary and secondary electronic items comprise vehicle system controls.

3. The vehicle instrument panel assembly of claim 1 wherein the primary electronic item comprises heating ventilation and air conditioning and radio controls.

4. The vehicle instrument panel assembly of claim 1 wherein the secondary electronic item comprises navigation system controls.

5. The vehicle instrument panel assembly of claim 1 wherein the secondary electronic item comprises a digital video disc player.

6. The vehicle instrument panel assembly of claim 1 wherein the secondary electronic item comprises cell phone recharging port.

7. The vehicle instrument panel assembly of claim 1 wherein the secondary electronic item comprises a personal digital assistant recharging port.

8. The vehicle instrument panel assembly of claim 1 further comprising a release button for selectively unlocking the console for movement between the open and closed positions.

9. The vehicle instrument panel assembly of claim 8 wherein the console is lockable in the open and closed positions.

10. A vehicle instrument panel assembly comprising:
an instrument panel portion; and
a console pivotably connected to the instrument panel portion about a horizontal axis of rotation, the console movable between open and closed positions relative to the instrument panel portion, the console comprises a first surface portion having a primary vehicle system control and a second surface portion having a secondary vehicle system control, the primary vehicle system control being accessible to a vehicle occupant when the console is in the open and closed positions, and the secondary vehicle system control being accessible to the vehicle occupant only when the console is in the open position.

11. The vehicle instrument panel assembly of claim 10 wherein the console is lockable in the open and closed positions.

12. The vehicle instrument panel assembly of claim 10 wherein the primary vehicle system control comprises heating ventilation and air conditioning and radio controls.

13. The vehicle instrument panel assembly of claim 10 wherein the secondary vehicle system control comprises navigation system controls.

14. The vehicle instrument panel assembly of claim 10 wherein the secondary vehicle system control comprises digital video disc controls.

15. The vehicle instrument panel assembly of claim 10 further comprising a release button for selectively unlocking the console for movement between the open and closed positions.

16. A vehicle instrument panel assembly comprising:
an instrument panel portion; and
a console pivotably connected to the instrument panel portion about a horizontal axis of rotation, the console movable between open and closed positions relative to the instrument panel portion, the console comprises a first surface portion having radio and heating ventilation and air conditioning controls and a second surface portion having navigation system controls, the radio and heating ventilation and air conditioning controls being accessible to a vehicle occupant when the console is in the open and closed positions, and the navigation system controls being accessible to the vehicle occupant only when the console is in the open position.

17. The vehicle instrument panel assembly of claim 16 wherein the console is lockable in the open and closed positions.

18. The vehicle instrument panel assembly of claim 16 further comprising a release button for selectively unlocking the console for movement between the open and closed positions.

19. The vehicle instrument panel assembly of claim 16 wherein the second surface portion has a cell phone recharging port.

20. The vehicle instrument panel assembly of claim 16 wherein the second surface portion includes a personal digital assistant recharging port.

* * * * *